*INVENTOR.*
CARL E. JOHANSON
BY Grover C. Foster
ATTORNEY

Oct. 5, 1965  C. E. JOHANSON  3,209,593
FLIGHT CONDITION SENSING
Filed April 21, 1960  2 Sheets-Sheet 2

INVENTOR.
CARL E. JOHANSON
BY *Grover C. Slater*
ATTORNEY

United States Patent Office 3,209,593
Patented Oct. 5, 1965

3,209,593
FLIGHT CONDITION SENSING
Carl E. Johanson, Davenport, Iowa, assignor to The Bendix Corporation, a corporation of Delaware
Filed Apr. 21, 1960, Ser. No. 23,688
1 Claim. (Cl. 73—182)

This invention relates to improvements in sensing flight conditions, particularly those flight conditions which vary as a function of altitude pressure.

Altitude pressure is determined, conventionally, by a static tube which opens at the exterior of an aerospace craft. However, in practice the pressure in the tube varies with the speed and direction of the air movement relative to the craft as well as with altitude pressure. The measured or indicated altitude pressure is substantially equal to actual altitude pressure times some function of Mach number. The function is determined primarily by configuration of the craft and location of the static tube. Thus each type or model of craft is characterized by a particular function of Mach number. The functions for different types of craft differ widely. However, the invention is capable of providing compensated flight condition sensors for all craft.

An object of the invention is to provide very accurate sensors of flight conditions that vary with altitude pressure despite errors in the measured values of altitude pressure.

Another object is to provide improved and simplified servoed flight condition sensors.

Other objects and advantages of the invention will hereinafter appear in the description of an embodiment of the invention first in the form of an altitude and rate of climb sensor and then in an airspeed and acceleration function sensor, which are shown in the accompanying drawing, it being understood that various modifications, other than those shown, may be made in the embodiment illustrated and that other embodiments are possible.

While the invention is applicable to mechanical as well as electro-mechanical sensors, it is especially advantageous when embodied in electro-mechanical apparatus. Accordingly, an electro mechanical embodiment has been selected for illustration.

Certain of these objects are realized by providing a first signal whose value is a function of indicated altitude pressure as the actual value of the flight condition to be sensed is a function of actual altitude pressure. Simultaneously, there is provided a second or corrected flight condition signal whose magnitude is equal to the sum of the value of the first signal and the difference between its value and the value it would have if indicated altitude pressure was equal to actual altitude pressure. The second signal is produced by providing a Mach number correction signal whose value is proportional to the value of said second signal times the ratio of Mach number to the value of said flight condition, providing an error signal corresponding to a predetermined value for any combination of the magnitudes of said second and said Mach correction signals, and combining said first and said correction signals.

Use of a servo loop makes it possible to feed back the corrected flight condition signal for use in deriving the Mach number signal on the basis of which the corrected flight condition signal is found.

Figure 1:
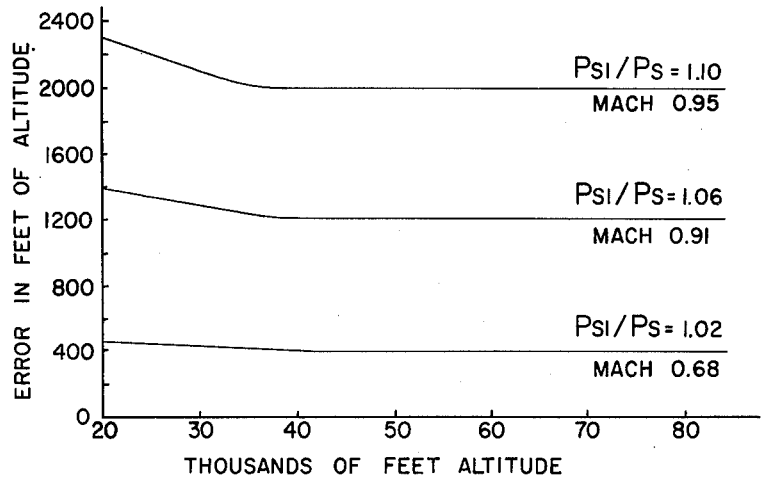
FIG. 1 is a graph of error in an uncompensated altimeter plotted against altitude for various ratios of indicated altitude pressure to actual altitude pressure made specific to one representative type of aircraft by the addition of Mach numbers corresponding to each ratio.

Before describing an embodiment of the invention in an altitude sensor, reference is made to FIG. 1 which shows a family of curves. Each curve shows the relation between the error in feet of altitude and actual altitude, for a selected ratio of indicated altitude pressure to actual altitude pressure (Psi/Ps) in an uncompensated altitude sensor. Thus far described, the curves are not specific to sensors in any one kind of aerospace vehicle but apply to all uncompensated sensors. However, in all such vehicles the ratio Psi/Ps is a function of Mach number. The function is determined in wind tunnel experiments and actual flight tests in the course of defining the flight characteristics of the craft type.

The Mach number corresponding to various values of Psi/Ps for a representative type of aircraft have been added to FIG. 1 as an example.

Figure 2:
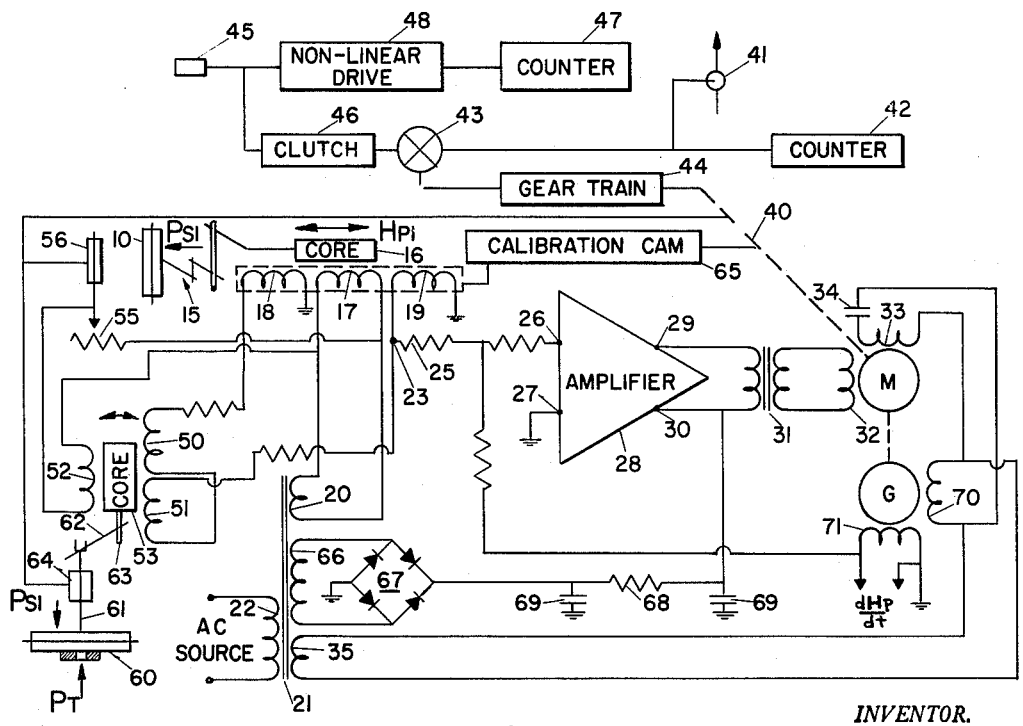
FIG. 2 is a schematic diagram of a compensated altimeter embodying the invention.

The embodiment selected for illustration in FIG. 2 is an altimeter. Indicated altitude pressure, which may differ from actual altitude pressure at various Mach numbers as defined by FIG. 1, is applied to an aneroid capsule 10 whereby the aneroid expands and contracts as a function of indicated altitude pressure. The aneroid 10 actuates an altitude computing mechanism, generally designated 15, of conventional form, such as the link, bi-metal, lever arm, and indicated altitude shaft shown. This mechanism positions core 16 in accordance with indicated pressure altitude, Hpi, and any suitable one of the known indicated altitude sensors may be employed.

The position of core 16 comprises a first signal or indicated pressure altitude signal which represents indicated pressure altitude. The core comprises part of a differential transformer which includes an input winding 17 and differentially wound output coils 18 and 19. Winding 17 is connected to secondary winding 20 of a power transformer 21 whose primary winding 22 is connected to an A.C. source of electrical power. The magnitude of the voltage induced in each of transformer windings 18 and 19 depends upon the position of core 16 relative to said windings.

Windings 17, 18, and 19 are mounted for movement together relative to core 16 by a means to be described below. They are moved to a position in which the voltage induced in the combination of windings 18 and 19 is proportional to the difference between the first signal, or position of core 16, and the value said signal would have if aneroid 10 were subjected to actual altitude pressure rather than indicated altitude pressure. Thus the position of windings 17, 18, 19 is proportional to actual pressure altitude.

Windings 18 and 19 each have one end connected to common ground and are included in a circuit which is traced from the ground connection of winding 18, through winding 18 and thence through a coil 50 and a coil 51 to a terminal point 23 and through coil 19 to common ground. Coils 50 and 51 are the serially connected, opposed secondary windings of a transformer to be described later. Terminal 23 is connected through a series resistor 25 to one input terminal 26 of an amplifier 28. The other input terminal 27 of amplifier 28 is connected to common ground and thus to the grounded end of windings 18 and 19. The magnitude of the resultant voltage applied across terminals 26 and 27 by windings 18, 19, 50 and 51 is proportional to the amount by which the position of windings 17, 18, and 19 differs from the position corresponding to corrected pressure altitude. The phase of the resultant voltage reverses when the sign of the difference changes.

The resultant voltage is amplified in amplifier 28 to appear at the amplifier output terminals 29 and 30. The primary winding of an output transformer 31 is connected across terminals 29 and 30. Its secondary winding is connected across one winding 32 of a motor M whose other winding 33 is connected, in series with a phase-shifting capacitor 34, across a secondary winding 35 of power transformer 21. The motor M rotates in a direction determined by the phase of the voltage at the amplifier input terminals 26 and 27. The motor rotation is applied, as indicated by dashed line 40, through a calibration cam to position coils 17, 18, and 19 in a direction such that a reduced voltage is applied to amplifier input terminals 26 and 27. This continues until zero voltage is applied to those terminals. At this condition motor rotation stops and the rotational position of the motor, and the position of coils 17, 18, and 19, corresponds to actual pressure altitude.

Returning to windings 18, 19, 50, and 51, a voltage is induced in the serially opposed combination of windings 50 and 51 which, for the case shown, does not reverse in phase but the magnitude of which may vary whereby it is proportional at any time to the difference between current indicated pressure altitude and current actual pressure altitude. Windings 50 and 51 are connected in series with winding 18 across terminals 26 and 27 in parallel with winding 19. Viewed from terminals 26 and 27, the voltages across windings 18 and 19 are in phase and the voltage across winding 18 is opposite in phase to the resultant voltage across windings 50 and 51. Thus the voltage across terminals 26–27 will be zero when coils 18 and 19 are positioned such that the voltage across winding 19 is equal to the difference between the error voltage across the combined windings 50–51 and the voltage of coil 18. If the error voltage is reduced, the position of coils 18 and 19 must change so that the terminal 26–27 voltage is again zero. Specifically, if error voltage is reduced, the coils are repositioned such that coil 18 voltage decreases and coil 19 voltage increases. Conversely, if error voltage increases, coil 18 voltage must be increased and coil 19 voltage decreased by movement of the coils in the opposite direction.

Effectively, then, the error signal and indicated pressure altitude signal are added to produce the corrected pressure altitude signal which is represented by the position of coils 18 and 19 and by the rotational position of motor M.

The Mach number transformer of which windings 50 and 51 are secondaries, includes a primary winding 52 and a movable (here rotatable) core 53. The magnitude of the voltage induced in windings 50 and 51 may be varied by rotation of core 53. In this case the voltage induced in one of the windings exceeds that induced in the other over the whole range of core movement so that the phase of their combined voltage does not reverse. Windings 50 and 51 are connected in voltage opposition. Since the voltage induced in the secondary windings also varies with the degree of energization of the primary windings, two means for controlling secondary voltage magnitude are provided. Thus the voltage may be controlled by varying the primary winding energization and by varying the position of core 53.

Referring again to FIG. 1, the error in indicated pressure altitude, and to whose magnitude the error signal must correspond for complete correction, is a function of altitude and Mach number. All of the curves have substantially the same proportion. The change in error with altitude is substantially proportionally the same at all pressure ratios ($Psi/Ps$) and the magnitude of the error at any given altitude is a function of Mach number. Thus an error signal of proper magnitude can be derived for any combination of Mach number and altitude by varying the energization of winding 52 in accordance with one of Mach number or altitude and positioning core 53 in accordance with the other. In the embodiment of FIG. 2 energization of winding 52 is varied as a function of altitude and the position of core 53 is varied as a function of Mach number.

Winding 52 is connected through a rheostat 55 to secondary winding 20 of the supply transformer 21 whereby its energization will be varied as the rheostat tap is moved. The tap is moved by a cam and follower combination 56, the cam being rotated in accordance with altitude by motor M. The combination of cam shape and rheostat resistance taper is effective to vary the energization of winding 52, as the cam is rotated from low to high altitude position, proportionally to the change in error as altitude is increased over that range.

Core 53 is positioned in accordance with Mach number, or more specifically so that the error voltage induced in the comibnation of windings 50 and 51 at any degree of energization of winding 52 is proportional to the error shown in FIG. 1 to correspond to the altitude represented by such degree of energization of winding 52. It is positioned by a Mach number sensor. The sensor shown comprises a mechanism sensitive to altitude pressure and dynamic pressure. The latter is the difference between indicated altitude pressure and total pressure which is measured, commonly, by the Pitot tube of the aerospace craft. The embodiment shown includes the usual diaphragm capsule 60, whose interior is subjected to total pressure $Pt$ and whose exterior is subjected to indicated altitude pressure. A follower link 61 is moved longitudinally by capsule 60 and it engages a rotatable lever 62 connected to a Mach number shaft 63. Thus far described, elements 60 through 63 comprise the elements of a conventional Mach number sensor. Commonly, an aneroid sensitive to indicated altitude pressure is employed in Mach sensors to move follower link 61 and change its point of engagement with lever 62. This could be accomplished by using the motion of aneroid 10 or a separate aneroid. However, the position of the shaft of motor M corresponds to corrected pressure altitude which varies as the logarithm of the inverse of altitude pressure. In the embodiment illustrated, a cam 64 is mounted for rotation by motor M so that it moves link 61. The cam 64 is cut so that for any position the camming distance is a function of current corrected altitude pressure.

Mach number is a function of the difference between total pressure less altitude pressure all divided by altitude pressure or $(Pt-Ps)/Ps$. In the case of the embodiment shown the capsule 60 is subjected to total pressure less indicated altitude pressure whereby core 53 is rotated by shaft 63 as a function of $(Pt-Psi)/Ps$ or $$(Pt/Ps)-(Psi/Ps)$$

The latter, being known for each value of Mach number from FIG. 1, can readily be taken into account and an appropriate correction made in the design of the Mach number sensor in accordance with conventional instrument design procedures.

The error is not proportional to Mach number but is a complex function of Mach number as shown in FIG. 1. Thus the voltage induced in the combination of windings 50 and 51 must vary proportionally not with Mach number but with said function of Mach number. Accordingly, in this case, the combination of movement of core 63 by lever 62 and the electrical characteristics of the transformer are selected to provide an induced voltage variation which, for any given altitude, varies with Mach number as error varies with Mach number in FIG. 1. In the case shown, the transformer is arranged to provide the required function but it will be obvious that the function can be generated by cams in the driving connection to the core.

Unidirectional electrical power for amplifier 28 is supplied by the combination of a secondary winding 66 on transformer 21, a bridge rectifier 67 and a filter including resistor 68 and two filter capacitors 69.

Motor M drives a generator G having a winding 70 connected across secondary power transformer winding 21. A voltage proportional to the speed of rotation of the generator G is induced in its winding 71. This voltage is applied as an error-rate damping signal to the input terminals of amplifier 28. It is also made available as a signal representing rate of climb or descent because it varies as the rate of change of altitude, $dHp/dt$.

It is virtually impossible to manufacture aneroid capsules which are identical to one another. So that sensitive instruments which employ such capsules may be repaired by replacing one capsule with another, it is conventional practice to include in the mechanism an adjustable element by which the instrument may be "calibrated." The element most often used is an adjustable cam. Such a cam 65 is included in the instrument shown in FIG. 2.

Rotation of motor M is also applied, as indicated by dashed line 40, to a pointer 41 and a counter wheel mechanism 42 through a differential 43 and gear train 44. These elements comprise a common form of visual display unit. The counter and pointer indicate altitude. A barometric pressure-set knob 45 is turned, with clutch 46 normally engaged, to add the barometric pressure correction to the visual display through differential 43. Disengagement of clutch 46 provides means for correcting relationship of the altitude as indicated by the counter 42 and pointer 41 and the barometric pressure indicator counter 47. Such rotation of knob 45 rotates a counter wheel mechanism 47 marked with barometric pressure numbers through a non-linear drive 48. These elements are, and represent, a conventional barometric pressure-set mechanism.

In operation of the instrument shown in FIG. 2, aneroid 10 is subjected to indicated altitude pressure and the aneroid moves core 16 to a position corresponding to indicated pressure altitude. The position of core 16 determines the amount of voltage induced in each of the oppositely phased transformer windings 18 and 19. The voltage difference across these windings is applied to and amplified by an amplifier 28 whose output drives a motor M. The motor drives the display mechanism and alters the position of windings relative to core 16 until a null is reached. However, an error voltage signal is subtracted from the voltage across winding 18 effectively changing the null position of motor M and windings 18 and 19 by the amount of the error signal and resulting in addition, in the movement of the motor shaft, of the indicated altitude signal and the error signal. The error signal is generated in a transformer whose primary energization and core position are altered as a function of altitude and Mach number respectively whereby the magnitude of the error signal for any combination of altitude and Mach number corresponds to the value shown in FIG. 1.

Figure 4:
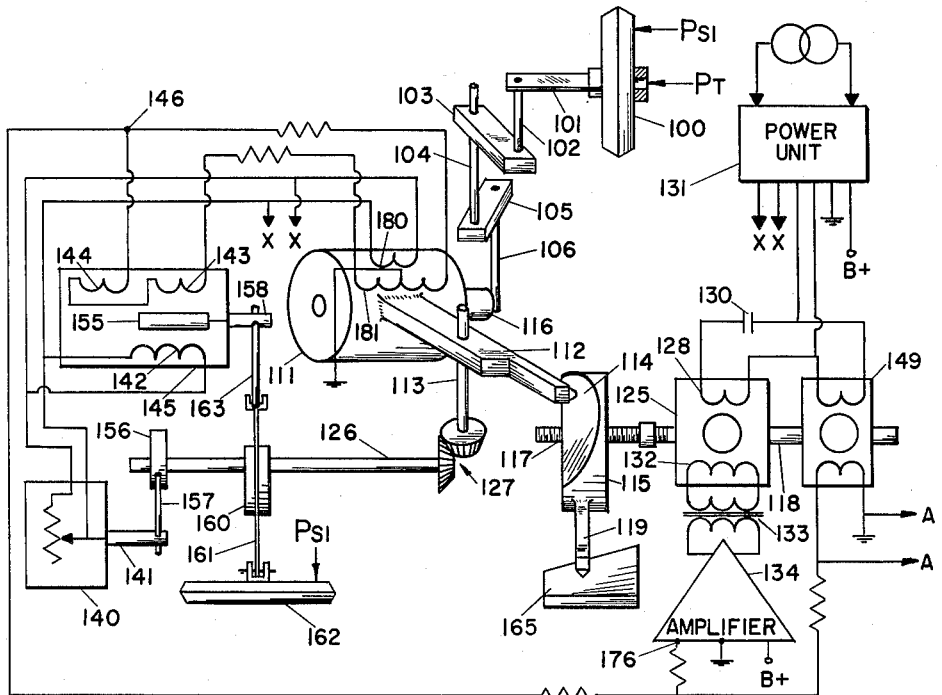
FIG. 4 is a schematic diagram of a compensated calibrated airspeed indicator embodying the invention.

If it included the visual display elements and if its diaphragm capsule and its aneroid capsule were interchanged, the compensated calibrated airspeed sensor shown in FIG. 4 would be a compensated pressure altitude sensor like that shown in FIG. 2. The motor, generator, Mach transformer, amplifier, power unit, and sensing transformer are alike in the two embodiments.

Figure 3:
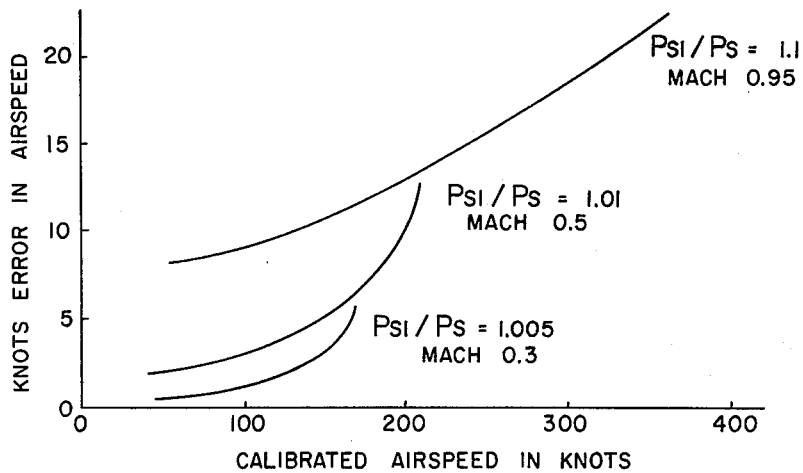
FIG. 3 is a graph of error in calibrated airspeed in an airspeed sensor plotted against calibrated airspeed for various ratios of indicated altitude pressure to actual altitude pressure.

Before describing FIG. 4, however, it is explained that FIG. 3 is a graph including a family of curves, each showing the error in knots at various speeds in knots for one value of the ratio of indicated altitude pressure to actual altitude pressure. The value of the ratio varies with Mach number and each curve is marked with the corresponding Mach number which characterizes a representative model of aircraft.

In FIG. 4 the exterior of diaphragm capsule 100 is subjected to indicated altitude pressure P$si$ and its interior is subjected to total or Pitot pressure. The diaphragm expands and contracts with variations in the "differential" or dynamic pressure thereby moving link 101 and the bimetal 102, one end of which is attached to link 101. The other end of bimetal 102 rotatably engages one end of an arm 103 whose other end is attached to an airspeed shaft 104. These elements 100 through 104 comprise a conventional calibrated airspeed sensor.

A second arm 105 is fixed at one end to airspeed shaft 104. A rod 106, fixed at one end to the arm 105, extends substantially parallel to shaft 104 to a connection at its opposite end with one end of an airspeed transformer core 116. The core 116 moves through an arc about the axis of airspeed shaft 104 which is equal to the degree of rotation of shaft 104. Accordingly, the position of core 116 is proportional to indicated calibrated airspeed.

In addition to core 116, which is equivalent to core 16 in FIG. 2, airspeed transformer 111 includes an energizing winding 180 and two secondary windings 181 and 182 one end of each of which is connected to common ground. These windings are equivalent to windings 17, 18 and 19 of FIG. 2. They are movable relative to core 116 on the line of movement of the core. The transformer housing is fixed to the end of a lever 112 which pivots on a shaft 113 whose axis is coincident with the axis of airspeed shaft 104. The other end of lever 112 comprises a cam follower cooperating with a cam surface 114 formed on a lead nut 115. The lead nut 115 is threaded on a lead screw 117 which comprises an extension of a motor shaft 118. An arm 119, extending laterally from lead nut 115, terminates in a cam follower which cooperates with an adjustable calibration cam 165.

When the motor 125 is energized, it rotates shaft 118, including lead screw section 117, whereby lead nut 115 is moved axially along the motor shaft. By this action lever 112 is rotated with its pivot shaft 113 and the windings of airspeed transformer 111 are moved relative to transformer core 116. As lead nut 115 is so moved it is also moved rotationally incident to the action of cam 165 whereby its axial movement on shaft 118 is increased or decreased slightly by an amount sufficient to overcome any calibration errors.

It will be explained that the axial position of lead nut 115 is proportional to compensated (also called "actual") calibrated airspeed. This being true, the position of the windings of transformer 111 relative to core 116, the total rotational position of motor shaft 118, and the rotational position of cam shaft 126 are all proportional to compensated calibrated airspeed. Cam shaft 126 is rotated by pivot shaft 113 through beveled gears 127.

The motor 125 comprises two windings. One winding 128 is connected through a phase-shifting capacitor 130 to a source of A.C. voltage in a power unit 131 and the other 132 is connected through an output transformer 133 to the output terminals of an amplifier 134. The motor windings are connected like windings 32 and 33 of motor M in FIG. 2 and are equivalent thereto. The power unit 131 is equivalent to transformer 21, rectifier 67, and filter 68–69 of FIG. 2.

Moreover, the electrical circuit of FIG. 4 is identical to the electrical circuit of FIG. 2.

The rheostat 140, whose tap rotates with shaft 141, is connected in series with an energizing winding 142 in Mach transformer 145 which corresponds to winding 52 in FIG. 2. This series combination is connected at X—X across an alternating voltage source in power unit 131. The transformer also includes two opposed, serially connected windings, 143 and 144 which are equivalent to windings 50 and 51, respectively, of FIG. 2, and which are connected to the secondary windings of transformer 111 between a terminal point 146 and common ground as windings 50 and 51 are connected to windings 18 and 19 between terminal 23 and common ground in FIG. 2. Just as terminal 23 is connected to amplifier input terminal 26 in FIG. 2, so terminal 146 is connected to input terminal 176 of amplifier 134 in FIG. 4.

To complete the description of the electrical circuit of the airspeed sensor, generator 149 comprises two windings corresponding respectively to windings 70 and 71 in FIG. 2, which are connected to power unit 131 and amplifier 134 as windings 70 and 71 are connected to transformer 21 and amplifier 28. Whereas in FIG. 2 the signal $dHp/dt$ appears at the terminals connected across winding 71, a signal which is a function of acceleration appears across the corresponding terminals A—A in FIG. 4.

In the absence of a signal voltage in secondary windings 143 and 144 of Mach transformer 145, the input voltage to amplifier 134 would comprise a voltage equal to the difference between the voltages induced in the two secondary windings 181 and 182 of transformer 111. In this circumstance, motor 125 would drive the windings through lead screw and nut 117 and 115 to a position relative to core 116 at which the induced voltages of those two windings were equal. This null position of the windings would correspond to indicated calibrated airspeed. However, an error voltage proportional to the difference between the indicated and actual value of calibrated airspeed is generated in the secondary windings 143 and 144 of Mach transformer 145. The error voltage is added to the voltage of winding 181 and the combined voltage is applied to amplifier 134. Accordingly, motor 125 drives the windings of transformer 111 to a null position relative to core 16 which corresponds to actual calibrated airspeed.

As illustrated in FIG. 3 the error varies as a function of actual calibrated airspeed and Mach number. Thus the error signal voltage induced in the combination of windings 143 and 144 must be proportional, to the extent that accurate correction is required, to the same function. This is accomplished in the embodiment of FIG. 4 by the provision of two means, varying the degree of energization of winding 142 and rotationally positioning the transformer core 155, for varying the magnitude of the error voltage.

The energization of winding 142 is controlled by varying the position of the tap of rheostat 141 in accordance with the calibrated airspeed function. Cam shaft 126 has a rotational position corresponding to corrected calibrated airspeed. Cam 156, carried by shaft 126, and follower 157, carried by rheostat shaft 141, rotates the shaft 141 relative to the potentiometer resistor according to the calibrated airspeed function.

The rotational position of core 155 is controlled by rotation of shaft 158 as a function of Mach number. Mach number is a function of the ratio of dynamic pressure to actual altitude pressure. Airspeed is a function of dynamic pressure and is represented by the position of cam shaft 126. Thus dynamic pressure can be computed from the rotational position of shaft 126 and means are provided for its computation in cam 160 which is carried by shaft 126. The cam 160 is cut so that the camming distance to its follower 161 is a function of the dynamic pressure corresponding to any rotation position of shaft 126.

Actual altitude pressure is not available but an aneroid 162 is included to provide indicated altitude pressure information. The aneroid has a driving connection to one end of follower 161. The other end of the follower 161 is forked to receive and drive a rod 163 which is fixed to shaft 158. Shaft 158 rotates transformer core 155. By this arrangement, the forked end of follower 161 and shaft 158 are made to move in accordance with Mach number. One or more of elements which comprise this Mach number sensor or, as here, the transformer itself is modified, as will be understood, so that the voltage induced in windings 143 and 144 varies with Mach number as FIG. 3 defines error to vary with Mach number.

In operation of the calibrated airspeed sensor of FIG. 4, indicated calibrated airspeed is measured in capsule 100 and its computing mechanism 101, 102, 103, and 104 whereby the airspeed transformer core 116 is positioned in accordance with indicated calibrated airspeed. A servo comprising the differentially connected secondary windings of the airspeed transformer 111, the amplifier 134, the motor 125, the lead screw and nut mechanism 117 and 115, and the pivoted lever 112 drive the transformer 111 housing with its windings to a null position.

However, the null position is offset by the amount of the difference between indicated calibrated airspeed and actual calibrated airspeed by the algebraic addition of an error signal to the induced voltage in one of the secondary windings of the airspeed transformer 111 whereby the transformer housing and its coils are driven to a null position corresponding to actual calibrated airspeed.

The error signal is developed in a Mach number correction transformer.

I claim:

An altitude sensor comprising a transformer having a core and a winding; a source of electrical power; means for energizing said winding from said source in variable degree independent of the relative position of said core and winding; said winding and core being relatively movable to alter the energization of said winding; means responsive to energization of said winding for providing an output variable as a selected function of altitude; and means responsive to said output, and means responsive to indicated altitude pressure, and means jointly responsive to indicated altitude and total pressure in a degree which varies substantially as error in indicated altitude varies with indicated altitude and total pressures for altering a respectively associated one of the degree in which said winding is energized from said source, the position of said core relative to said winding and the position of said winding relative to said core.

References Cited by the Examiner

UNITED STATES PATENTS

| 2,657,350 | 10/53 | Rossire | 244—77 |
| 2,694,927 | 11/54 | Coulbourn et al. | 73—182 |
| 2,806,353 | 9/57 | Grafinger | 73—182 X |
| 2,944,736 | 7/60 | Elms et al. | 73—182 |
| 2,950,075 | 8/60 | Owen | 244—77 |
| 2,985,012 | 5/61 | Wail | 73—182 |
| 3,002,382 | 10/61 | Gardner | 73—182 |
| 3,090,229 | 5/63 | Howard | 73—182 |

ISAAC LISANN, *Primary Examiner.*

ROBERT L. EVANS, *Examiner.*